Jan. 20, 1970   R. H. ROGERS ET AL   3,490,706
WASTE PULVERIZER
Filed Sept. 5, 1967
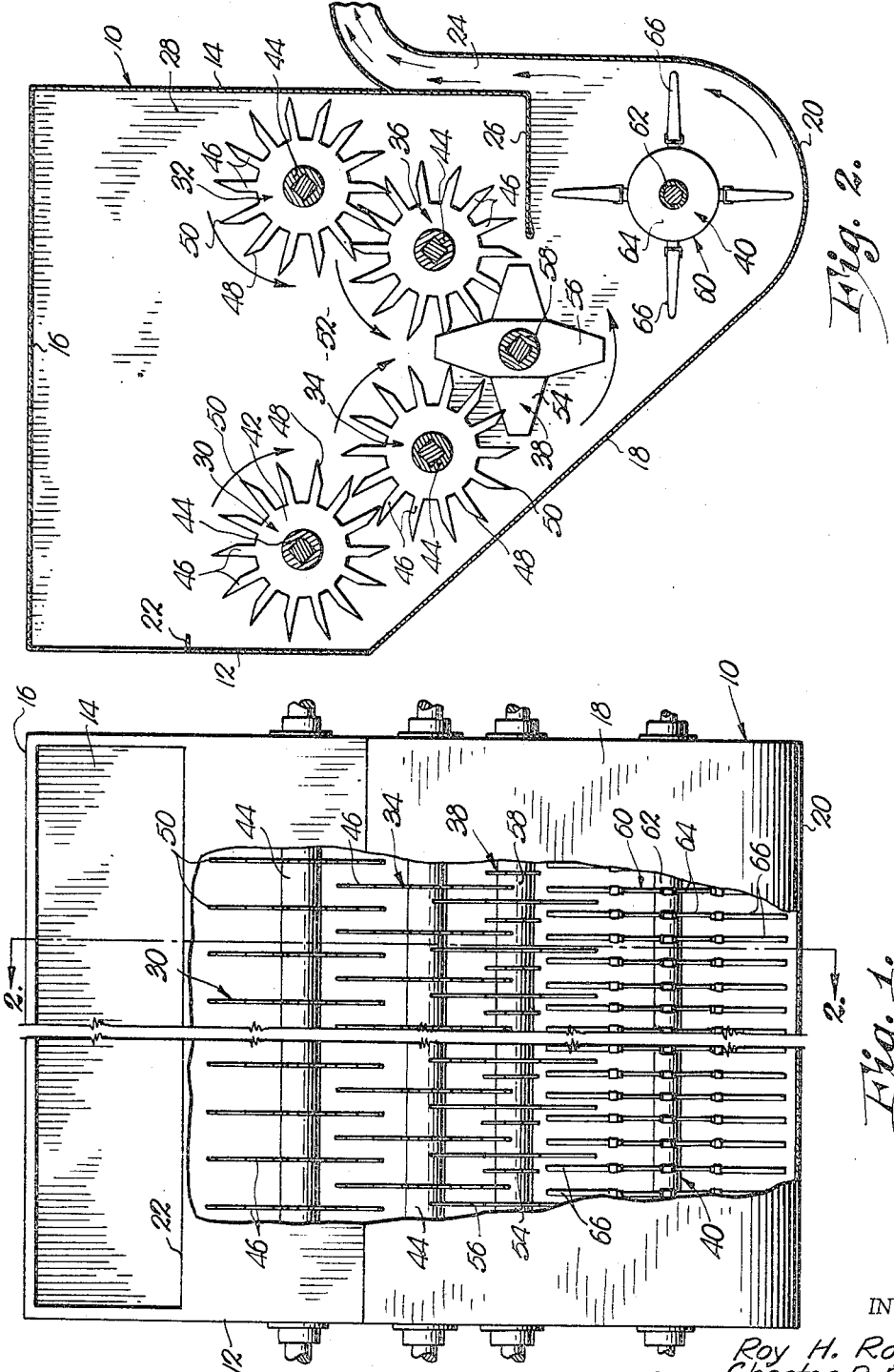
INVENTORS
Roy H. Rogers
Chester D. Rogers
BY
ATTORNEYS

United States Patent Office 3,490,706
Patented Jan. 20, 1970

3,490,706
WASTE PULVERIZER
Roy H. Rogers, 1004 Stratfort, and Chester D. Rogers, R.R. 4, both of Olathe, Kans. 66061
Filed Sept. 5, 1967, Ser. No. 665,336
Int. Cl. B02c 13/00, 23/02
U.S. Cl. 241—186           4 Claims

ABSTRACT OF THE DISCLOSURE

A waste pulverizer having a plurality of feeder reels, a cutter reel and an exhaust reel for handling virtually all types of materials such as cardboard boxes, cans, wood cratings, garbage and paper, the feeder reels being made and disposed so as to provide constant and uniform feeding of the materials into the blades of the cutter reel at a positive rate so as to prevent clogging or choking of the cutters, the pronged discs of the feeder reels being so interleaved with the blades of the cutter reel that the material is cleared from the feeders as it is being fed to the cutter. The exhaust reel directs the pulverized material from the housing into a container so as to provide effortless disposal of the waste.

---

It is the primary object of the present invention to provide a waste pulverizer capable of handling a wide variety of materials and reduce the bulk thereof so as to appreciably reduce the time, expense and difficulties encountered at manufacturing plants, wholesale establishments, retail stores and other points where a waste disposal problem is encountered.

The most important object of the instant invention is the provision of a waste pulverizer which has a novel feeder arrangement capable of discharging the waste, whether in the form of a large cardboard box or in the nature of smaller material, at a rate to the cutter which will assure complete breakup into small particles without clogging or jamming of any of the continuously rotating parts of the assembly.

In the drawing:

FIGURE 1 is a front elevational view of a waste pulverizer made pursuant to our present invention, parts being broken away to reveal details of construction; and FIG. 2 is a vertical cross-sectional view taken on line 2—2 of FIG. 1.

A suitable housing 10 chosen for illustration of the principles of the instant invention has a front wall 12, a rear wall 14, a top wall 16 and an inclined wall 18 spanning the distance between front wall 12 and an arcuate bottom wall 20. An inlet 22 is provided in the front wall 12 and an outlet 24 at the rear wall 14 communicates with the housing 10 at the bottom 20 below shelf 26 which extends inwardly into the housing 10 from the lower edge of rear wall 14 above bottom 20.

The end walls of the housing 10, one of which is shown in FIG. 2 and designated by the numeral 28, support the shafts of a plurality of reels, including four feeder reels 30, 32, 34 and 36, a cutter reel 38 and an exhaust reel 40.

The feeder reels are identical, each including a plurality of discs 42 held in spaced relationship by sleeves 44, each disc being in turn provided with a series of radial prongs 46 at its periphery. Each prong 46 has a beveled edge 48 terminating in a relatively sharp outermost end 50.

The two reels 30 and 32 are within a common horizontal plane that is spaced above the horizontal plane common to the reels 34 and 36 and the distance between the reels 30 and 32 is greater than between the reels 34 and 36, presenting a V-shaped entrance throat 52 having its apex aligned with the reel 38 directly thereabove. The prongs 46 of the reel 30 interleave with the prongs 46 of the reel 34 and the same interleaving arrangement is provided between reels 32 and 36.

The cutter reel 38 is provided with a plurality of pairs of blades 54 and 56 held spaced by sleeves 58. Each blade 54, 56 intersects the axis of rotation of the reel 38, there being a pair of blades 54, 56 between each pair of discs 30 of reel 34 and, therefore, between each pair of discs 30 of the reel 36. The blades 54 and 56 of each pair thereof are preferably at right angles relatively as shown in FIG. 2.

The exhaust reel 40 rotates about an axis parallel with the axes of the reels 30, 32, 34, 36 and 38 and includes a plurality of finger units 60 spaced by sleeves 62. Each unit 60 includes a plate 64 having a plurality of resilient fingers 66 spaced apart along its periphery.

All of the reels rotate in the direction of the arrows appearing in FIG. 2 and while the speeds of rotation may be selected to suit the desires of the operator, it has been found desirable to rotate the reels 30 and 32 at approximately 63.6 r.p.m., to rotate the reels 34 and 36 at approximately 79.6 r.p.m., and to rotate the reel 38 at approximately 1487 r.p.m.

In operation, the material to be pulverized is fed into the housing 10 through the inlet 22 where it is immediately picked up by the prongs 46 of the reels 30 and 32 and fed downwardly and inwardly toward the feeder reels 34 and 36, the latter of which in turn feed the material to the cutter reel 38.

In many types of waste materials such as cardboard boxes, the prongs 46 of all of the feeder reels actually pierce the waste material and thereby prevent any kickback toward the top wall 16 of housing 10. By the same token, however, by virtue of the bevels 48, prongs 46 readily release themselves from the waste material as the material is continued to be fed to the cutter reel 38. The construction of the four feeder reels 30, 32, 34 and 36, as above described and as seen in the drawing, is such as to direct the waste material continuously and uniformly to the cutter reel 38 without any jamming, clogging or sudden surges. Moreover, the material is held in position by the feeder reels 34 and 36 to be acted upon by the cutter reel 38; that is to say, the blades 54 and 56 continually act upon the material and cannot tend to project such material upwardly within the housing 10 toward the top wall 16 because of the holding action of the feeder reels 34 and 36. In the same manner the waste material is received immediately by the reels 34 and 36 as soon as delivered thereto by the reels 30 and 32, precluding any retrograde action of the material within the throat 52 toward the top wall 16.

The interleaved relationship between the blades 54 and 56 and the discs of the reels 34 and 36 not only causes the material to be acted upon by the reel 38 while the material is held in place by the reels 34 and 36 but renders the cutter reel 38 self cleaning so that all of the pulverized material is immediately delivered to the exhaust reel 40.

Manifestly, the rubber fingers 66 of the exhaust reel 40 pick up the pulverized substances and create artificial currents of air for directing the material from the housing 10 in the direction of the arrows shown in chute 24. Sacks or other containers may be positioned to receive the pulverized waste from the outlet of the exhaust chute 24 as may be desired.

Having thus described the invention, what is claimed as new and desired to be secured by Letters Patent is:

1. A waste pulverizer comprising:
   a housing having an inlet and an outlet;
   a plurality of elongated reels mounted in the housing between the inlet and the outlet for rotation about spaced, parallel, horizontal axes, there being a first pair of oppositely rotating feeder reels having their axes of rotation in a first common horizontal plane and disposed to receive waste material therebetween from said inlet, a second pair of oppositely rotating feeder reels having their axes of rotation in a second common horizontal plane below said first plane and disposed to receive the material from the first pair of feeder reels, a cutter reel below the second pair of feeder reels and disposed for receiving the material therefrom, and an exhaust reel below the cutter reel, disposed for receiving the material from the cutter reel and directing the same through the outlet.

the distance between the first pair of feeder reels being greater than the distance between the second pair of feeder reels, presenting a V-shaped, material-receiving throat, the feeder reels all rotating inwardly and downwardly into said throat toward the cutter reel, each feeder reel having a number of spaced feeder discs therealong, the cutter reel having a number of pairs of spaced, crossed cutter blades therealong, the exhaust reel having a number of spaced blower fingers therealong.

2. The invention of claim 1,
the discs of each feeder reel of said first pair of feeder reels interleaving with the discs of the proximal feeder reel of said second pair of feeder reels.

3. The invention of claim 2,
each pair of blades of the cutter reel being disposed between a pair of discs of each of said second pair of feeder reels.

4. The invention of claim 3,
each prong of each feeder reel having a beveled end terminating in a sharp outermost end.

References Cited

UNITED STATES PATENTS

| | | | |
|---|---|---|---|
| 1,609,529 | 12/1926 | Trowbridge | 241—186 X |
| 1,840,749 | 1/1932 | Stresau | 241—186 X |
| 2,122,658 | 7/1938 | Preston | 241—186 X |
| 2,158,240 | 5/1939 | Mankoff | 241—186 X |
| 2,183,583 | 12/1939 | Patterson | 146—122 X |
| 2,374,456 | 4/1945 | Ravndal et al. | |
| 2,505,023 | 4/1950 | Williamson. | |
| 2,889,862 | 6/1959 | Williamson. | |
| 2,894,697 | 7/1959 | Panning et al. | 241—190 X |
| 3,322,353 | 5/1967 | Paly | 241—190 X |

FRANK T. YOST, Primary Examiner

U.S. Cl. X.R.

241—190